United States Patent
Iitaka et al.

(10) Patent No.: US 11,673,606 B2
(45) Date of Patent: Jun. 13, 2023

(54) DRIVING SUPPORT DEVICE, DRIVING SUPPORT METHOD, AND STORAGE MEDIUM

(71) Applicant: HONDA MOTOR CO., LTD., Tokyo (JP)

(72) Inventors: Ryo Iitaka, Wako (JP); Minoru Higuchi, Wako (JP); Aya Sasaki, Wako (JP); Yoshimitsu Akuta, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/679,237

(22) Filed: Feb. 24, 2022

(65) Prior Publication Data

US 2022/0297755 A1 Sep. 22, 2022

(30) Foreign Application Priority Data

Mar. 17, 2021 (JP) .............................. JP2021-043095

(51) Int. Cl.
*B62D 6/00* (2006.01)
*B62D 15/02* (2006.01)
*B62D 5/04* (2006.01)

(52) U.S. Cl.
CPC ......... *B62D 15/025* (2013.01); *B62D 5/0481* (2013.01); *B62D 6/00* (2013.01)

(58) Field of Classification Search
CPC ....... B62D 15/025; B62D 5/0481; B62D 6/00
See application file for complete search history.

(56) References Cited

FOREIGN PATENT DOCUMENTS

JP 2014-237337 12/2014

*Primary Examiner* — Mathew Franklin Gordon
(74) *Attorney, Agent, or Firm* — Amin, Turocy & Watson, LLP

(57) ABSTRACT

A driving support device includes: a trajectory deriving unit configured to derive a reference trajectory in a predetermined section corresponding to a predetermined curve shape; a frequency deriving unit configured to derive a first frequency which is determined according to a frequency component of a steering angle of a vehicle when it is assumed that the vehicle has passed through the predetermined section along the reference trajectory; a detection value acquiring unit configured to acquire a detection value of the steering angle; a component deriving unit configured to derive a frequency component of the steering angle acquired in the predetermined section when the vehicle has passed through the predetermined section; and a driving support unit configured to determine a driving support operation for a driver of the vehicle on the basis of a result of comparison between an integrated value of the frequency component in a first band equal to or greater than the first frequency and equal to or less than a second frequency and a first reference value.

8 Claims, 8 Drawing Sheets

DRIVING SUPPORT DEVICE, DRIVING SUPPORT METHOD, AND STORAGE MEDIUM

CROSS-REFERENCE TO RELATED APPLICATION

Priority is claimed on Japanese Patent Application No. 2021-043095, filed Mar. 17, 2021, the content of which is incorporated herein by reference.

BACKGROUND OF THE INVENTION

Field of the Invention

The present invention relates to a driving support device, a driving support method, and a storage medium.

Description of Related Art

A detection device that detects an abnormality of a driving state on the basis of a result of frequency conversion of a steering angle is disclosed in Japanese Unexamined Patent Application, First Publication No. 2014-237337. This detection device derives a frequency component ratio of a steering angle. The detection device determines whether a driving state is abnormal on the basis of whether a change in a frequency component ratio is greater than a predetermined value.

SUMMARY OF THE INVENTION

However, such a detection device merely detects whether a driving state is abnormal, but does not perform driving support for a driver. Even when a driving support device performs driving support on the basis of a result of detection from the detection device, the driving support device performs driving support of steering or the like in the same way for all drivers. In this way, there is a problem in that the driving support device cannot perform driving support according to a driving skill of a driver.

An aspect of the present invention was invented in consideration of the aforementioned circumstances, and an objective thereof is to provide a driving support device, a driving support method, and a storage medium that can perform driving support according to a driving skill of a driver.

In order to solve the aforementioned problem and to achieve the aforementioned objective, the present invention employs the following aspects.

(1) According to an aspect of the present invention, there is provided a driving support device including: a trajectory deriving unit configured to derive a reference trajectory in a predetermined section corresponding to a predetermined curve shape; a frequency deriving unit configured to derive a first frequency which is determined according to a frequency component of a steering angle of a vehicle when it is assumed that the vehicle has passed through the predetermined section along the reference trajectory; a detection value acquiring unit configured to acquire a detection value of the steering angle; a component deriving unit configured to derive a frequency component of the steering angle acquired in the predetermined section when the vehicle has passed through the predetermined section; and a driving support unit configured to determine a driving support operation for a driver of the vehicle on the basis of a result of comparison between an integrated value of the frequency component in a first band equal to or greater than the first frequency and equal to or less than a second frequency and a first reference value.

(2) In the aspect of (1), the driving support unit may be configured to decrease a degree of driving support for the driver of the vehicle when the integrated value of the frequency component in the first band is less than the first reference value.

(3) In the aspect of (1) or (2), the driving support device may be configured to increase a degree of driving support for the driver of the vehicle when the integrated value of the frequency component in a second band equal to or greater than the second frequency is equal to or greater than a second reference value.

(4) In the aspect of (3), the driving support unit may be configured to determine a relationship between an amount of departure of the vehicle from a lane and a steering reaction force for preventing departure of the vehicle from the lane according to the degree of driving support when the steering reaction is output from a steering device of the vehicle as the driving support operation.

(5) In the aspect of (3), the driving support unit may be configured to adjust a speed of the vehicle according to the degree of driving support and an inter-vehicle distance when the inter-vehicle distance of the vehicle is maintained as the driving support operation.

(6) In the aspect of any one of (1) to (5), the trajectory deriving unit may be configured to derive the reference trajectory as a candidate for a target trajectory of the vehicle on the basis of an integrated value of the frequency component in a third band equal to or greater than a third frequency determined according to the frequency component of the steering angle and equal to or less than the first frequency out of the frequency components of the steering angle acquired in the predetermined section in the past.

(7) According to another aspect of the present invention, there is provided a driving support method that is performed by a computer of a driving support device, the driving support method including: a trajectory deriving step of deriving a reference trajectory in a predetermined section corresponding to a predetermined curve shape; a frequency deriving step of deriving a first frequency which is determined according to a frequency component of a steering angle of a vehicle when it is assumed that the vehicle has passed through the predetermined section along the reference trajectory; a detection value acquiring step of acquiring a detection value of the steering angle; a component deriving step of deriving a frequency component of the steering angle acquired in the predetermined section when the vehicle has passed through the predetermined section; and a driving support step of determining a driving support operation for a driver of the vehicle on the basis of a result of comparison between an integrated value of the frequency component in a first band equal to or greater than the first frequency and equal to or less than a second frequency and a first reference value.

(8) According to another aspect of the present invention, there is provided a non-transitory computer-readable storage medium storing a program causing a computer to perform: a trajectory deriving process of deriving a reference trajectory in a predetermined section corresponding to a predetermined curve shape; a frequency deriving process of deriving a first frequency which is determined according to a frequency component of a steering angle of a vehicle when it is assumed that the vehicle has passed through the predetermined section along the reference trajectory; a detection value acquiring process of acquiring a detection value of the steering angle; a component deriving process of deriving a frequency component of the steering angle acquired in the predetermined section when the vehicle has passed through the predetermined section; and a driving support process of determining a driving support operation for a driver of the vehicle on the basis of a result of comparison between an integrated value of the frequency component in a first band equal to or greater than the first frequency and equal to or less than a second frequency and a first reference value.

According to the aspects of (1) to (8), it is possible to perform driving support according to a driving skill of a driver by determining a driving support operation on the basis of a result of comparison between an integrated value of a frequency component in a predetermined first band and a predetermined first reference value.

DETAILED DESCRIPTION OF THE INVENTION

Hereinafter, a driving support device, a driving support method, and a storage medium according to an embodiment of the present invention will be described with reference to the accompanying drawings.

Overall Configuration

Figure 1:
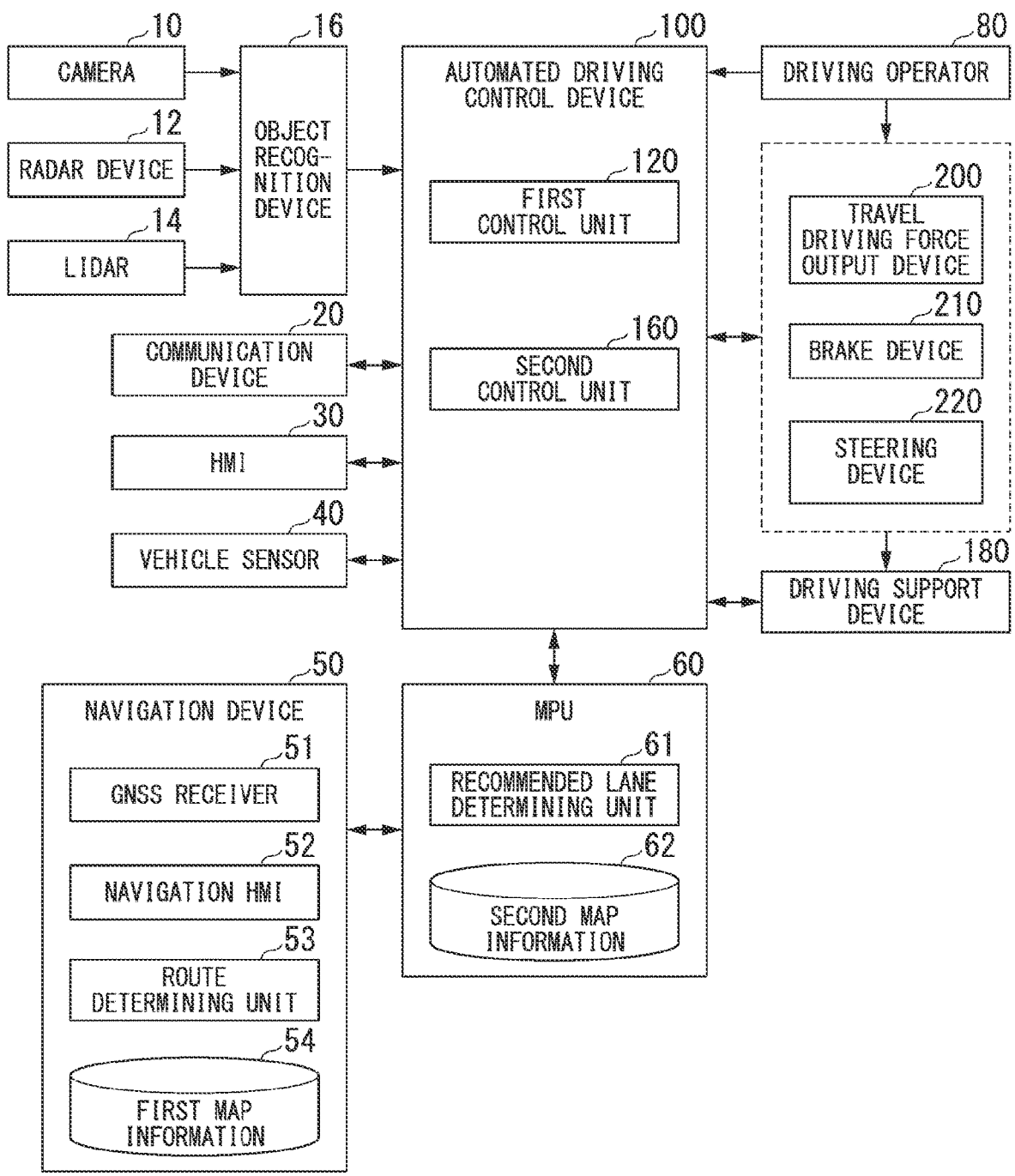
FIG. 1 is a diagram illustrating an example of a configuration of a vehicle system employing an automated driving control device and a driving support device according to an embodiment.

FIG. 1 is a diagram illustrating an example of a configuration of a vehicle system 1 employing an automated driving control device 100 and a driving support device according to an embodiment. A vehicle in which the vehicle system 1 is mounted is, for example, a vehicle with two wheels, three wheels, or four wheels and a drive source thereof is an internal combustion engine such as a diesel engine or a gasoline engine, an electric motor, or a combination thereof. The electric motor operates using electric power generated by a power generator connected to the internal combustion engine or electric power discharged from a secondary battery or a fuel cell.

The vehicle system 1 includes, for example, a camera 10, a radar device 12, a Light Detection and Ranging (LIDAR) 14, an object recognition device 16, a communication device 20, a human-machine interface (HMI) 30, a vehicle sensor 40, a navigation device 50, a map positioning unit (MPU) 60, a driving operator 80, an automated driving control device 100, a driving support device 180, a travel driving force output device 200, a brake device 210, and a steering device 220. These devices or instruments are connected to each other via a multiplex communication line such as a controller area network (CAN) communication line, a serial communication line, a radio communication network, or the like. The configuration illustrated in FIG. 1 is only an example and a part of the configuration may be omitted or another configuration may be added thereto.

The camera 10 is, for example, a digital camera using a solid-state imaging device such as a charge coupled device (CCD) or a complementary metal oxide semiconductor (CMOS). The camera 10 is attached to an arbitrary position on a vehicle in which the vehicle system 1 is mounted (hereinafter referred to as a host vehicle M). When the front view of the host vehicle M is imaged, the camera 10 is attached to an upper part of a front windshield, a rear surface of a rearview mirror, or the like. The camera 10 images the surroundings of the host vehicle M, for example, periodically and repeatedly. The camera 10 may be a stereoscopic camera.

The radar device 12 radiates radio waves such as millimeter waves to the surroundings of the host vehicle M, detects radio waves (reflected waves) reflected by an object, and detects at least a position (a distance and a direction) of the object. The radar device 12 is attached to an arbitrary position on the host vehicle M. The radar device 12 may detect a position and a speed of an object using a frequency modulated continuous wave (FM-CW) method.

The LIDAR 14 radiates light (or electromagnetic waves of wavelengths close to light) to the surroundings of the host vehicle M and measures scattered light. The LIDAR 14 detects a distance to an object on the basis of a time from radiation of light to reception of light. The radiated light is, for example, a pulse-like laser beam. The LIDAR 14 is attached to an arbitrary position on the host vehicle M.

The object recognition device 16 performs a sensor fusion process on results of detection from some or all of the camera 10, the radar device 12, and the LIDAR 14 and recognizes a position, a type, a speed, and the like of an object. The object recognition device 16 outputs the result of recognition to the automated driving control device 100. The object recognition device 16 may output the results of detection from the camera 10, the radar device 12, and the LIDAR 14 to the automated driving control device 100 without any change. The object recognition device 16 may be omitted from the vehicle system 1.

The communication device 20 communicates with other vehicles near the host vehicle M, for example, using a cellular network, a Wi-Fi network, Bluetooth (registered trademark), or dedicated short range communication (DSRC) or communicates with various server devices via a radio base station.

The HMI 30 presents various types of information to an occupant of the host vehicle M and receives an input operation from the occupant. The HMI 30 includes various display devices, speakers, buzzers, touch panels, switches, and keys.

The vehicle sensor 40 includes a vehicle speed sensor that detects a speed of the host vehicle M, an acceleration sensor that detects an acceleration, a yaw rate sensor that detects an angular velocity around a vertical axis, and a direction sensor that detects a direction of the host vehicle M.

The navigation device 50 includes, for example, a global navigation satellite system (GNSS) receiver 51, a navigation HMI 52, and a route determining unit 53. The navigation device 50 stores first map information 54 in a storage device such as a hard disk drive (HDD) or a flash memory. The GNSS receiver 51 identifies a position of the host vehicle M on the basis of signals received from GNSS satellites. The position of the host vehicle M may be identified or corrected by an inertial navigation system (INS) using the output of the vehicle sensor 40. The navigation HMI 52 includes a display device, a speaker, a touch panel, and keys. A whole or a part of the navigation HMI 52 may be shared by the HMI 30. For example, the route determining unit 53 determines a route (hereinafter, referred to as a "route on a map") from the position of the host vehicle M identified by the GNSS receiver 51 (or an input arbitrary position) to a destination input by an occupant using the navigation HMI 52 with reference to the first map information 54. The first map information 54 is, for example, information in which a road shape is expressed by links indicating a road and nodes connected by the links. The first map information 54 may include a curvature of a road or point of interest (POI) information. The route on a map is output to the MPU 60. The navigation device 50 may perform route guidance using the navigation HMI 52 on the basis of the route on a map. The navigation device 50 may be realized, for example, by a function of a terminal device such as a smartphone or a tablet terminal which is carried by an occupant. The navigation device 50 may transmit a current position and a destination to a navigation server via the communication device 20 and acquire a route which is equivalent to the route on a map from the navigation server.

The MPU 60 includes, for example, a recommended lane determining unit 61 and stores second map information 62 in a storage device such as an HDD or a flash memory. The recommended lane determining unit 61 divides a route on a map supplied from the navigation device 50 into a plurality of blocks (for example, every 100 [m] in a vehicle travel direction) and determines a recommended lane for each block with reference to the second map information 62. The recommended lane determining unit 61 determines in which lane from the leftmost the host vehicle is to travel. When there is a branching point in the route on a map, the recommended lane determining unit 61 determines a recommended lane such that the host vehicle M can travel along a rational route for traveling to a branching destination.

The second map information 62 is map information with higher precision than the first map information 54. The second map information 62 includes, for example, information on the centers of lanes or information on boundaries of lanes. The second map information 62 may include road information, traffic regulation information, address information (addresses and postal codes), facility information, and phone number information. The second map information 62 may be updated from time to time by causing the communication device 20 to communicate with another device.

The driving operator 80 includes, for example, an accelerator pedal, a brake pedal, a shift lever, a steering wheel, a deformed steering wheel, a joystick, and other operators. A sensor that detects an amount of operation or performing of an operation is attached to the driving operator 80. Results of detection of the sensor are output to the automated driving control device 100 or output to some or all of the travel driving force output device 200, the brake device 210, and the steering device 220.

The automated driving control device 100 includes, for example, a first control unit 120 and a second control unit 160. The first control unit 120 and the second control unit 160 are realized, for example, by causing a hardware processor such as a central processing unit (CPU) to execute a program (software). Some or all of such elements may be realized by hardware (which includes circuitry) such as a large scale integration (LSI), an application specific integrated circuit (ASIC), a field-programmable gate array (FPGA), or a graphics processing unit (GPU) or may be realized by software and hardware in cooperation. The program may be stored in a storage device (a storage device including a non-transitory storage medium) such as an HDD or a flash memory of the automated driving control device 100 in advance, or may be stored in a removable storage medium such as a DVD or a CD-ROM and installed in the HDD or the flash memory of the automated driving control device 100 by setting the removable storage medium (non-transitory storage medium) to a drive device.

Figure 2:
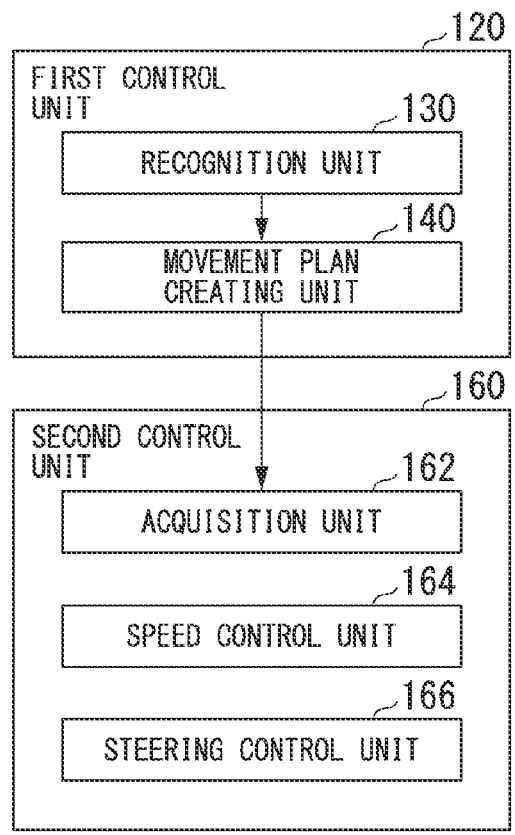
FIG. 2 is a diagram illustrating an example of functional configurations of a first control unit and a second control unit.

FIG. 2 is a diagram illustrating an example of functional configurations of the first control unit 120 and the second control unit 160. The first control unit 120 includes, for example, a recognition unit 130 and a movement plan creating unit 140. For example, the first control unit 120 realizes a function based on artificial intelligence (AI) and a function based on a predetermined model together. For example, a function of "recognizing a crossing" may be realized by performing recognition of a crossing based on deep learning or the like and recognition based on predetermined conditions (such as signals and road signs which can be pattern-matched), scoring both recognitions, and comprehensively evaluating the recognitions. Accordingly, reliability of automated driving is secured.

The recognition unit 130 recognizes states such as a position, a speed, and an acceleration of an object near the host vehicle M on the basis of information input from the camera 10, the radar device 12, and the LIDAR 14 via the object recognition device 16. For example, a position of an object is recognized as a position in an absolute coordinate system with an origin set to a representative point of the host vehicle M (such as the center of gravity or the center of a drive shaft) and is used for control. A position of an object may be expressed as a representative point such as the center of gravity or a corner of the object or may be expressed as a drawn area. A "state" of an object may include an acceleration or a jerk of the object or a "moving state" (for example, whether lane change is being performed or whether lane change is going to be performed) thereof.

The recognition unit 130 recognizes, for example, a lane (a travel lane) in which the host vehicle M is traveling. For example, the recognition unit 130 recognizes the travel lane by comparing a pattern of lane boundary lines near the host vehicle M recognized from an image captured by the camera 10 with a pattern of lane boundary lines (for example, arrangement of a solid line and a dotted line) acquired from the second map information 62. The recognition unit 130 is not limited to the lane boundary lines, but may recognize the travel lane by recognizing travel road boundaries (road boundaries) including lane boundary lines, edges of roadsides, curbstones, median strips, and guard rails. In this recognition, the position of the host vehicle M acquired from the navigation device 50 and the result of processing from the INS may be considered. The recognition unit 130 recognizes a stop line, an obstacle, a red signal, a toll gate, or other road events.

The recognition unit 130 recognizes a position or a direction of the host vehicle M with respect to a travel lane at the time of recognition of the travel lane. The recognition unit 130 may recognize, for example, a separation of a reference point of the host vehicle M from the lane center and an angle of the travel direction of the host vehicle M with respect to a line formed by connecting the lane centers in the travel direction of the host vehicle M as the position and the direction of the host vehicle M relative to the travel lane. Instead, the recognition unit 130 may recognize a position of a reference point of the host vehicle M relative to one side line of the travel lane (a lane boundary line or a road boundary) or the like as the position of the host vehicle M relative to the travel lane.

The movement plan creating unit 140 creates a target trajectory in which the host vehicle M will travel autonomously (without requiring a driver's operation) in the future such that the host vehicle M can travel in a recommended lane determined by the recommended lane determining unit 61 and copes with surrounding circumstances of the host vehicle M in principle. A target trajectory includes, for example, a speed element. For example, a target trajectory is expressed by sequentially arranging points (trajectory points) at which the host vehicle M is to arrive. Trajectory points are points at which the host vehicle M is to arrive at intervals of a predetermined traveling distance (for example, about several [m]) along a road, and a target speed and a target acceleration at intervals of a predetermined sampling time (for example, about below the decimal point [sec]) are created as a part of the target trajectory in addition. Trajectory points may be positions at which the host vehicle M is to arrive at sampling times every predetermined sampling time. In this case, information of a target speed or a target acceleration is expressed by intervals between the trajectory points.

The movement plan creating unit 140 may set events of automated driving in creating a target trajectory. The events of automated driving include a constant-speed travel event, a low-speed following travel event, a lane change event, a branching event, a merging event, and an overtaking event. The movement plan creating unit 140 creates a target trajectory based on events which are started.

The second control unit 160 controls the travel driving force output device 200, the brake device 210, and the steering device 220 such that the host vehicle M travels along a target trajectory created by the movement plan creating unit 140 as scheduled.

Referring back to FIG. 2, the second control unit 160 includes, for example, an acquisition unit 162, a speed control unit 164, and a steering control unit 166. The acquisition unit 162 acquires information of a target trajectory (trajectory points) created by the movement plan creating unit 140 and stores the acquired information in a memory (not illustrated). The speed control unit 164 controls the travel driving force output device 200 or the brake device 210 on the basis of a speed element accessory to the target trajectory stored in the memory. The steering control unit 166 controls the steering device 220 on the basis of a curve state of the target trajectory stored in the memory. The processes of the speed control unit 164 and the steering control unit 166 are realized, for example, in combination of feed-forward control and feedback control. For example, the steering control unit 166 performs control in combination of feed-forward control based on a curvature of a road in front of the host vehicle M and feedback control based on a separation from the target trajectory.

The travel driving force output device 200 outputs a travel driving force (a torque) for allowing a vehicle to travel to driving wheels. The travel driving force output device 200 includes, for example, a combination of an internal combustion engine, an electric motor, and a transmission and an electronic control unit (ECU) that controls them. The ECU controls the elements on the basis of information input from the second control unit 160 or information input form the driving operator 80.

The brake device 210 includes, for example, a brake caliper, a cylinder that transmits a hydraulic pressure to the brake caliper, an electric motor that generates a hydraulic pressure in the cylinder, and a brake ECU. The brake ECU controls the electric motor on the basis of the information input from the second control unit 160 or the information input from the driving operator 80 such that a brake torque based on a braking operation is output to vehicle wheels. The brake device 210 may include a mechanism for transmitting a hydraulic pressure generated by an operation of the brake pedal included in the driving operator 80 to the cylinder via a master cylinder as a backup. The brake device 210 is not limited to the above-mentioned configuration, and may be an electronically controlled hydraulic brake device that controls an actuator on the basis of information input from the second control unit 160 such that the hydraulic pressure of the master cylinder is transmitted to the cylinder.

The steering device 220 includes, for example, a steering ECU and an electric motor. The electric motor changes a direction of turning wheels, for example, by applying a force to a rack-and-pinion mechanism. The steering ECU drives the electric motor on the basis of the information input from the second control unit 160 or the information input from the driving operator 80 to change the direction of the turning wheels.

Driving Support

Figure 3:
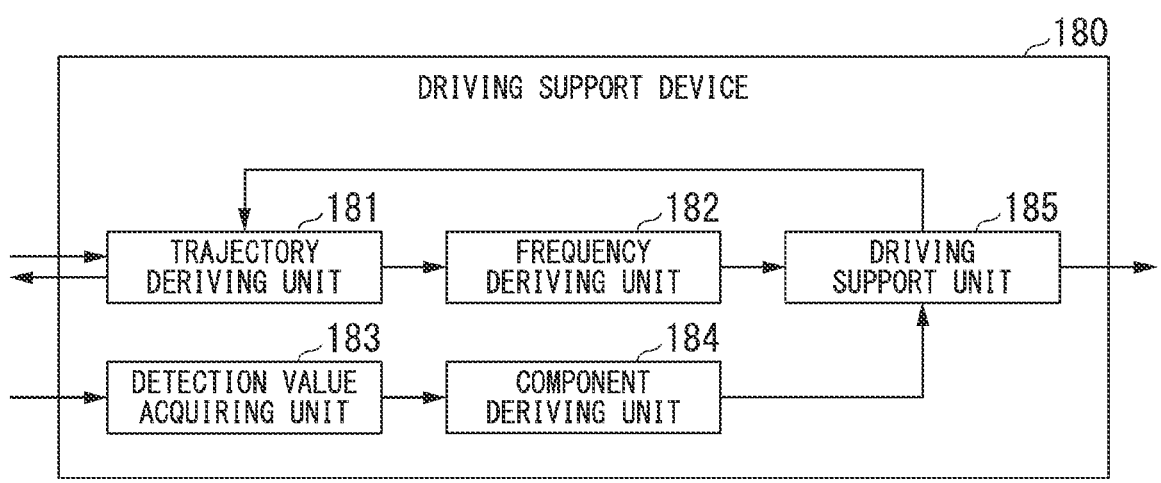
FIG. 3 is a diagram illustrating an example of a configuration of the driving support device.

FIG. 3 is a diagram illustrating an example of a configuration of the driving support device 180. The driving support device 180 includes a trajectory deriving unit 181, a frequency deriving unit 182, a detection value acquiring unit 183, a component deriving unit 184, and a driving support unit 185.

The elements of the driving support device 180 are realized, for example, by causing a hardware processor such as a CPU to execute a program (software). Some or all of such elements may be realized by hardware (which includes circuitry) such as an LSI, an ASIC, an FPGA, or a GPU or may be realized by software and hardware in cooperation. The program may be stored in a storage device such as an HDD or a flash memory (a storage device including a non-transitory storage medium) in advance, or may be stored in a removable storage medium (a non-transitory storage medium) such as a DVD or a CD-ROM and installed by setting the removable storage medium in a drive device.

The driving support device 180 estimates a driving skill and a driving style of a driver on the basis of a detection value of a frequency component of a steering angle of the vehicle. The driving style is, for example, a tendency of a trajectory of a vehicle (a driver's driving intention) when the vehicle passes through a predetermined section corresponding to a predetermined curve shape (curvature). A trajectory of the vehicle may be, for example, a trajectory with a small change in curvature (an out-in-out trajectory) or a trajectory with a lane center kept.

In the second map information 62, coordinates of the predetermined section corresponding to the predetermined curve shape are registered in advance. The predetermined section is, for example, a section of a road corresponding to at least one of the following sections (A1) to (A6). These are examples.

(A1) A section of a road corresponding to a curve shape with a curvature in which a vehicle can travel at an average speed of 50 km/h to 60 km/h.

(A2) A section of a road corresponding to a relatively simple curve shape including a section with a constant curvature and a relaxed section. The curve shape may be an S-shape.

(A3) A section of a road in which a length of a section with a constant curvature ranges from 80 m to 150 m and a length of a relaxed section ranges from 40 m to 50 m.

(A4) A section of a road with a relatively large road width (a section of a road with many options for a line to be taken).

(A5) A section of a road with a small longitudinal gradient.

(A6) A section of a road with a small lateral gradient and with little unevenness of a road surface (for example, a section of a new arterial road).

When the host vehicle has passed through coordinates of a predetermined section registered in advance in the second map information 62, the navigation device 50 notifies the MPU 60 that the host vehicle has passed through the predetermined section. The navigation device 50 may notify the MPU 60 that the host vehicle is passing through the predetermined section in a predetermined time before the host vehicle passes through the coordinates of the predetermined section registered in advance in the second map information 62.

The MPU 60 notifies the driving support device 180 that the host vehicle has passed through the predetermined section. The MPU 60 outputs curve shape data of the predetermined section to the trajectory deriving unit 181.

The trajectory deriving unit 181 acquires the curve shape data of the predetermined section registered in advance in the second map information 62 from the MPU 60. The trajectory deriving unit 181 derives a reference trajectory (a model trajectory) in the predetermined section on the basis of the curve shape data of the predetermined section through which the host vehicle has passed.

Figure 4:
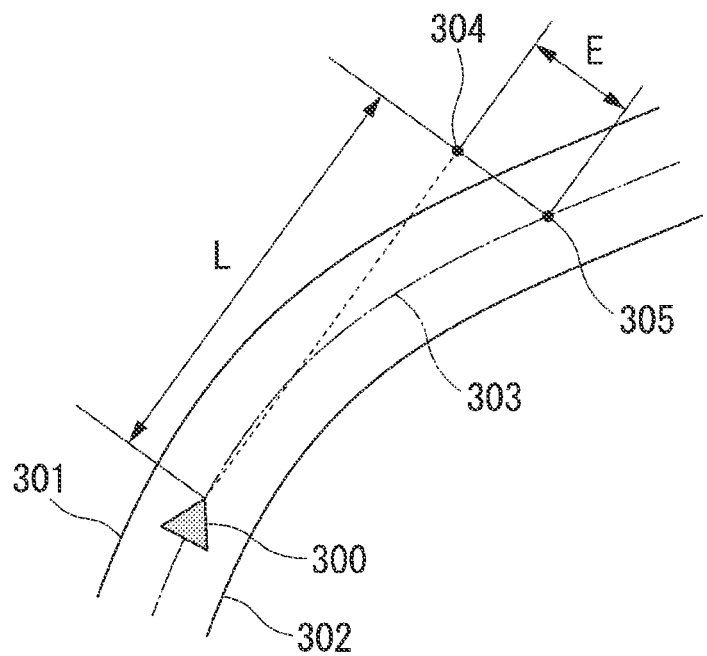
FIG. 4 is a diagram illustrating an example of a reference trajectory.

FIG. 4 is a diagram illustrating an example of the reference trajectory. A vehicle 300 travels in a predetermined section (road) illustrated in FIG. 4. A left edge 301 is a left end of a lane. A right edge 302 is a right end of the lane. A lane center locus 303 is a line (locus) by which the centers of the lane are connected. A fixation point 304 is a point on a straight line extending from a central position of the vehicle 300 in a longitudinal direction in front of the vehicle 300 and is a point which is watched by a driver. A locus point 305 is one point on the lane center locus 303. A straight line connecting the vehicle 300 to the fixation point 304 and a straight line connecting from the locus point 305 to the fixation point 304 perpendicularly cross each other at the fixation point 304.

The trajectory deriving unit 181 derives the left edge 301, the right edge 302, and the lane center locus 303 on the basis of map data of the predetermined section registered in advance in the second map information 62. The trajectory deriving unit 181 derives a reference trajectory on the basis of the left edge 301, the right edge 302, and the lane center locus 303. The curvature of the reference trajectory "k" [rad/m] is expressed by Expression (1).

$$k=2E/L^2 \qquad (1)$$

Here, a fixation distance "L" indicates a distance [m] from the vehicle 300 to the fixation point 304. A distance "E" indicates an error [m] (a fixation error) of the fixation point 304 with respect to the locus point 305.

Figure 5:
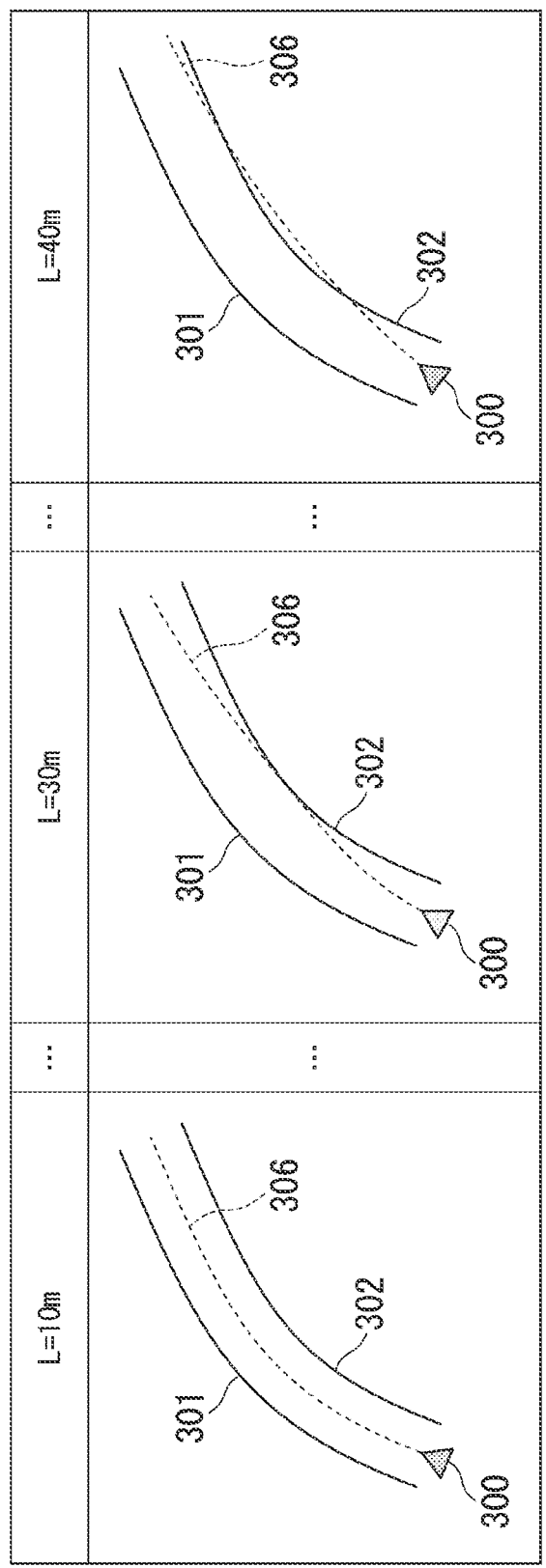
FIG. 5 is a diagram illustrating an example of a reference trajectory for each fixation distance.

FIG. 5 is a diagram illustrating an example of a reference trajectory for each fixation distance. A reference trajectory 306 is a trajectory of the vehicle 300 passing through a predetermined section corresponding to a predetermined curve shape. In "L=10 m" in the drawing, the reference trajectory 306 matches the lane center locus 303. In "L=30 m" in the drawing, the reference trajectory 306 is in contact with the right edge 302. In "L=40 m" in the drawing, the reference trajectory 306 departs from the right edge 302.

Therefore, the trajectory deriving unit 181 determines a longest fixation distance "$L_{exp}$" out of the fixation distances "L" in which the vehicle 300 does not depart from either of the left edge 301 and the right edge 302. The trajectory deriving unit 181 derives the reference trajectory 306 using the longest fixation distance "$L_{exp}$." In FIG. 5, the trajectory deriving unit 181 derives the reference trajectory 306 using the longest fixation distance "L=30 m." The trajectory deriving unit 181 outputs data of the reference trajectory 306 derived using the longest fixation distance "$L_{exp}$" to the frequency deriving unit 182.

The trajectory deriving unit 181 may derive a reference trajectory (a candidate for a target trajectory) which is used for the movement plan creating unit 140 to create a target trajectory. Here, the trajectory deriving unit 181 acquires an instruction indicating whether a fixation distance is set to the longest from the driving support unit 185. When an instruction indicating that a fixation distance is set to the longest is acquired from the driving support unit 185, the trajectory deriving unit 181 derives the reference trajectory on the basis of "L=30 m." The trajectory deriving unit 181 outputs the reference trajectory with a small change in curvature (an out-in-out trajectory) to the movement plan creating unit 140.

When an instruction indicating that a fixation distance is not set to the longest is acquired from the driving support unit 185, the trajectory deriving unit 181 derives the reference trajectory on the basis of the fixation distance "L=10 m." The trajectory deriving unit 181 outputs the reference trajectory with the lane center kept to the movement plan creating unit 140. Accordingly, the movement plan creating unit 140 can create a target trajectory of the vehicle such that it matches the reference trajectory (a candidate for the target trajectory) derived by the trajectory deriving unit 181.

Figure 6:
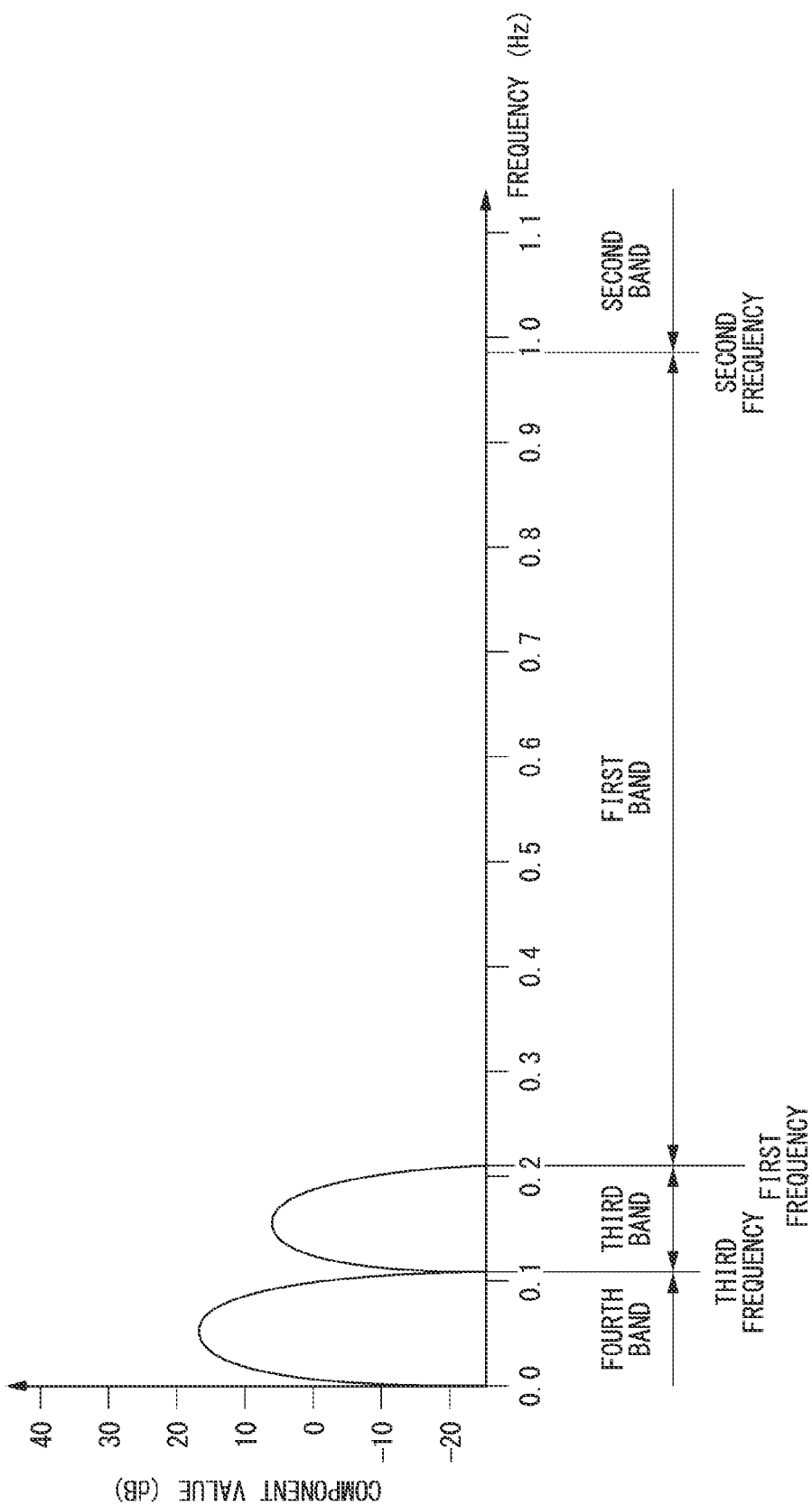
FIG. 6 is a diagram illustrating an example of frequency components of a reference trajectory.

FIG. 6 is a diagram illustrating an example of frequency components (a frequency spectrum) of a reference trajectory. In the following description, a band equal to or greater than a first frequency and equal to or less than a second frequency is referred to as a "first band." The first frequency is determined according to a frequency component of a steering angle of the vehicle when it is assumed that the vehicle has passed through a predetermined section along the reference trajectory. The second frequency is a frequency which is determined in advance as a frequency at which an acceleration of a predetermined value or more is applied to an occupant when the vehicle passes through the curve. The second frequency is, for example, a frequency in a range of 0.9 Hz to 1.2 Hz. In the following description, a band equal to or greater than the second frequency is referred to as a "second band."

In the following description, a band equal to or greater than a third frequency and equal to or less than the first frequency is referred to as a "third band." The third frequency is determined according to a maximum and a minimum of a curvature of a curve shape (major components of the curve shape of the predetermined section). In the following description, a band equal to or less than the third frequency is referred to as a "fourth band."

The frequency deriving unit 182 acquires data of the reference trajectory 306 derived using the longest fixation distance "$L_{exp}$" from the trajectory deriving unit 181. The frequency deriving unit 182 derives the first frequency when it is assumed that the vehicle 300 has passed through the predetermined section along the reference trajectory 306. Here, the frequency deriving unit 182 performs a fast Fourier transform on the data of the reference trajectory 306. The frequency deriving unit 182 derives a frequency in which the frequency component of the reference trajectory 306 is a valley in a frequency spectrum as the first frequency.

The frequency deriving unit 182 acquires data of at least one of the left edge 301 and the right edge 302 from the trajectory deriving unit 181. The frequency deriving unit 182 performs a fast Fourier transform on curvature data of a predetermined section (lane) which is determined according to at least one of the left edge 301 and the right edge 302. The frequency deriving unit 182 derives a frequency in which the frequency component of the curvature data of the predetermined section is a valley in a frequency spectrum as the third frequency. The frequency deriving unit 182 outputs data of the first frequency, data of the second frequency, and data of the third frequency to the driving support unit 185.

The detection value acquiring unit 183 acquires a detection value of a steering angle from the steering device 220 at intervals of a predetermined cycle. The detection value acquiring unit 183 outputs the detection value of the steering angle to the component deriving unit 184. When the vehicle 300 has passed through the predetermined section, the component deriving unit 184 derives a frequency component of the steering angle acquired in the predetermined section using a fast Fourier transform. The component deriving unit 184 outputs data of the frequency component of the steering angle to the driving support unit 185.

Figure 7:
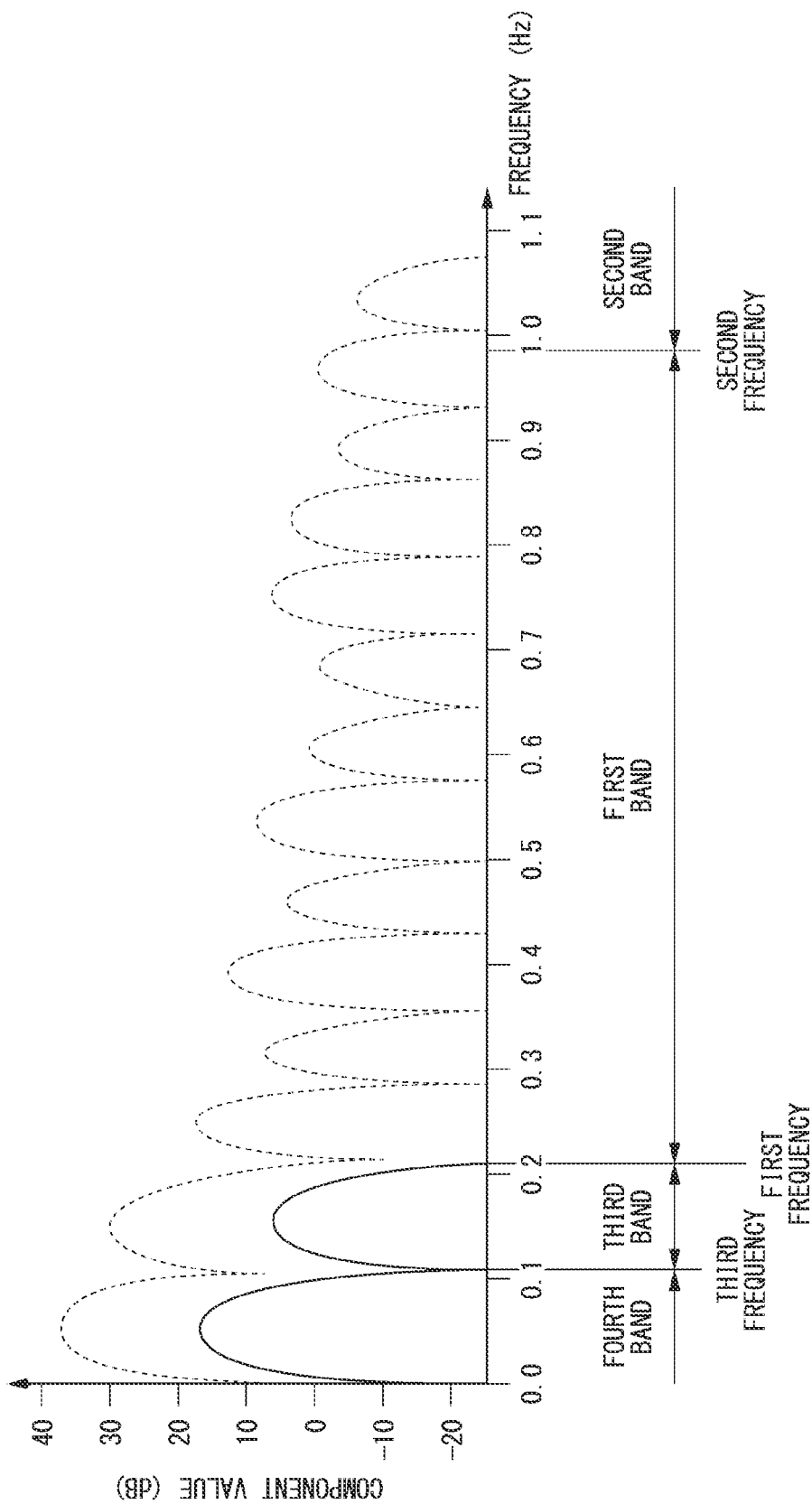
FIG. 7 is a diagram illustrating an example of frequency components of a steering angle.

FIG. 7 is a diagram illustrating an example of frequency components (a frequency spectrum) of a steering angle. In FIG. 7, the frequency components of the steering angle are indicated by dotted lines. A level of driving skill for departure prevention correction appears in the magnitude of an integrated value of frequency components in the first band. A level of driving skill for emergency avoidance correction appears in the magnitude of an integrated value of frequency components in the second band.

A difference in driving style appears in the magnitude of an integrated value of frequency components in the third band. For example, an integrated value of frequency components of the steering angle when the vehicle has traveled along a reference trajectory with a small change in curvature is smaller than an integrated value of frequency components in the steering angle when the vehicle has traveled along a reference trajectory with a lane center kept.

Differences in driving style and driving skill do not appear in the fourth band. As described above, this is because the frequency components of the steering angle in the fourth band are determined according to major components of the curve shape of the predetermined section.

The driving support unit 185 acquires data of the first frequency, data of the second frequency, and data of the third frequency from the frequency deriving unit 182. The driving support unit 185 acquires data of frequency components of the steering angle from the component deriving unit 184. The driving support unit 185 acquires one or more reference values from a storage unit. Such reference values are determined in advance, for example, on the basis of simulation results or experiment results.

The driving support unit 185 derives an integrated value of the frequency components of the steering angle in the first band. The driving support unit 185 determines a driving support operation (support operation information) for a driver of the vehicle 300 on the basis of a result of comparison between the integrated value of the frequency components in the first band and the first reference value. For example, when the integrated value of the frequency components in the first band is less than the first reference value, the driving support unit 185 determines that a driving skill of a driver (for example, a driving skill for departure prevention correction) is high and decreases a degree of driving support for the driver. For example, when the integrated value of the frequency components in the first band is equal to or greater than the first reference value, the driving support unit 185 determines that the driving skill of the driver is not high and increases the degree of driving support for the driver.

The driving support unit 185 may derive a skill score indicating the driving skill of the driver. The driving support unit 185 may determine the driving support operation for the driver of the vehicle 300 on the basis of the skill score. The HMI 30 may display the skill score.

The driving support unit 185 derives an integrated value of frequency components of the steering angle in the second band. When the integrated value of the frequency components in the second band is equal to or greater than the second reference value, the driving support unit 185 determines that the driving skill of the driver (for example, the driving skill for emergency avoidance correction) is not high and increases the degree of driving support for the driver.

The driving support unit 185 determines a relationship between an amount of departure of the vehicle from a lane (for example, a lane center) and a steering reaction force according to the degree of driving support. For example, the driving support unit 185 derives the steering reaction force corresponding to the amount of departure such that the steering reaction force increases as the degree of driving support increases. The driving support unit 185 outputs data of the steering reaction force to the steering device 220. Accordingly, the steering device 220 can generate a steering reaction force on the basis of the data of the steering reaction force.

The driving support unit 185 adjusts a speed of the vehicle as adaptive cruise control according to the degree of driving support and an inter-vehicle distance. For example, the driving support unit 185 decreases the speed of the vehicle such that the inter-vehicle distance increases as the degree of driving support increases. The driving support unit 185 outputs data of the speed of the vehicle to the trajectory deriving unit 181.

The driving support unit 185 derives an integrated value of the frequency components in the third band out of the frequency components of the steering angle acquired when the vehicle passed the predetermined section in the past. When the integrated value of the frequency components in the third band is less than the third reference value, the driving support unit 185 determines that the driving skill of the driver (for example, a skill of decreasing a change in curvature of a travel trajectory) is high and outputs an instruction to set the fixation distance to the longest to the trajectory deriving unit 181. For example, when the integrated value of the frequency components in the third band is equal to or greater than the third reference value, the driving support unit 185 determines that the driving skill of the driver is high and outputs an instruction not to set the fixation distance to the longest to the trajectory deriving unit 181.

The driving support unit 185 may determine the driving support operation for the driver of the vehicle 300 using a ratio of the integrated values of the frequency components instead of using the reference values for the integrated values of the frequency components. For example, the driving support unit 185 may determine the driving support operation for the driver of the vehicle 300 on the basis of a ratio of the integrated value of the frequency components in the first band to the integrated value of the frequency components in the third band. For example, the driving support unit 185 may determine the driving support operation for the driver of the vehicle 300 on the basis of a ratio of the integrated value of the frequency components in the first band to the total value of the integrated value of the frequency components in the third band and the integrated value of the frequency components in the fourth band.

Example of Operation of Driving Support Device

Figure 8:
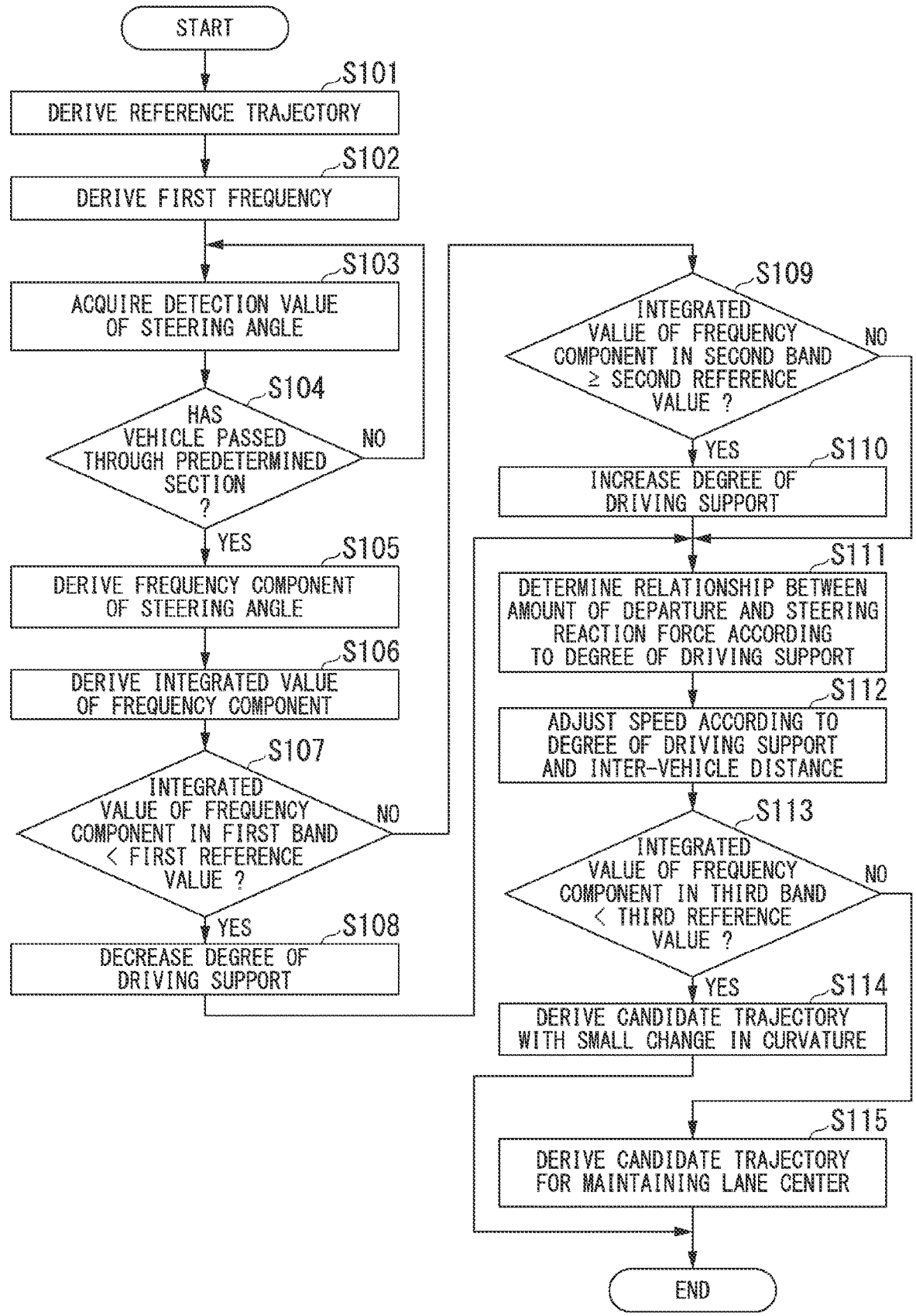
FIG. 8 is a flowchart illustrating an example of an operation of the driving support device.

FIG. 8 is a flowchart illustrating an example of an operation of the driving support device 180. The driving support device 180 derives a reference trajectory in a predetermined section corresponding to a predetermined curve shape (Step S101). Then, the frequency deriving unit 182 derives the first frequency (Step S102). Then, the detection value acquiring unit 183 acquires a detection value of a steering angle from the steering device 220 (Step S103).

Then, the component deriving unit 184 determines whether the vehicle has passed through the predetermined section (Step S104). When the vehicle has not passed through the predetermined section, the component deriving unit 184 returns the routine to Step S103. When the vehicle has passed through the predetermined section, the component deriving unit 184 derives frequency components of the steering angle acquired in the predetermined section (Step S105). Then, the driving support unit 185 derives an integrated value of the frequency components in the first band (Step S106).

Then, the driving support unit 185 determines whether the integrated value of the frequency components in the first band is less than the first reference value (Step S107). When the integrated value of the frequency components in the first band is less than the first reference value, the driving support unit 185 determines that the driving skill (skill level) of the driver in the driving operation is high and decreases the degree of driving support (Step S108). The driving support unit 185 causes the routine to proceed to Step S111.

When the integrated value of the frequency components in the first band is equal to or greater than the first reference value, the driving support unit 185 determines whether the integrated value of the frequency components in the second band is equal to or greater than the second reference value (Step S109). When the integrated value of the frequency components in the second band is less than the second reference value, the driving support unit 185 causes the routine to proceed to Step S111.

When the integrated value of the frequency components in the second band is equal to or greater than the second reference value, the driving support unit 185 determines that the driving skill of the driver in the driving operation is low and increases the degree of driving support (Step S110). Then, the driving support unit 185 (a lane keep support system) determines a relationship between an amount of departure of the vehicle from a lane (for example, a lane center) and a steering reaction force according to the degree of driving support (Step S111). Then, the driving support unit 185 adjusts the speed of the vehicle as adaptive cruise control according to the degree of driving support and the inter-vehicle distance (Step S112).

Then, the driving support unit 185 determines whether the integrated value of the frequency components in the third band is less than the third reference value (Step S113). When the integrated value of the frequency components in the third band is less than the third reference value, traveling along an out-in-out trajectory is peculiar to the driver, and thus the driving support unit 185 derives a reference trajectory with a small change in curvature (a small degree of curvature relaxing) on the basis of an instruction indicating that the fixation distance is set to the longest and outputs data of the derived reference trajectory to the movement plan creating unit 140 (Step S114). When the integrated value of the frequency components in the third band is equal to or greater than the third reference value, traveling along a trajectory with a lane center kept is peculiar to the driver, and thus the driving support unit 185 derives a reference trajectory for keeping the lane center on the basis of an instruction indicating that the fixation distance is not set to the longest and outputs data of the derived reference trajectory to the movement plan creating unit 140 (Step S115).

As described above, the trajectory deriving unit 181 derives a reference trajectory in a predetermined section corresponding to a predetermined curve shape. The frequency deriving unit 182 derives the first frequency on the basis of the reference trajectory. The detection value acquiring unit 183 acquires a detection value of a steering angle from the steering device 220. The component deriving unit 184 derives frequency components of the steering angle acquired in the predetermined section when the vehicle has passed through the predetermined section. The driving support unit 185 compares an integrated value of the frequency components in the first band with a first reference value. The driving support unit 185 determines a driving support operation for the driver of the vehicle on the basis of the result of comparison.

In this way, by determining the driving support operation on the basis of the result of comparison between the integrated value of the frequency components in the first band and the first reference value, the driving support device can perform driving support according to a driving skill of the driver. The driving support device can reduce discomfort which is felt by the driver from the driving support.

By determining the driving support operation on the basis of the result of comparison (the driving skill of the driver) between the integrated value of the frequency components in the second band and the second reference value, the driving support device can perform driving support according to the driving skill of the driver. By determining the driving support operation on the basis of the result of comparison between the integrated value of the frequency components in the third band and the third reference value, the driving support device can perform driving support according to the driving style of the driver.

Modified Examples

The driving support device 180 may record a curvature of a predetermined section (a section of a road) not registered in advance in the second map information 62 and the frequency components of the steering angle when the vehicle passes through the predetermined section. After the vehicle has passed through the predetermined section, the driving support device 180 may estimate a driving style of a driver on the basis of a detection value of the frequency components of the steering angle of the vehicle. The driving support device 180 stores the results of estimation of the driving skill of the driver and the driving style.

After the vehicle has passed through the predetermined section, the trajectory deriving unit 181 derives the left edge 301, the right edge 302, and the lane center locus 303 on the basis of the result of recognition from the object recognition device 16, the curvature of a travel trajectory of the vehicle, and an integrated value of the vehicle speed. Accordingly, the trajectory deriving unit 181 can determine the driving support operation for the driver of the vehicle even when the vehicle has passed through a section of a road (a predetermined section) not registered in advance in the second map information 62.

Hardware Configuration

Figure 9:
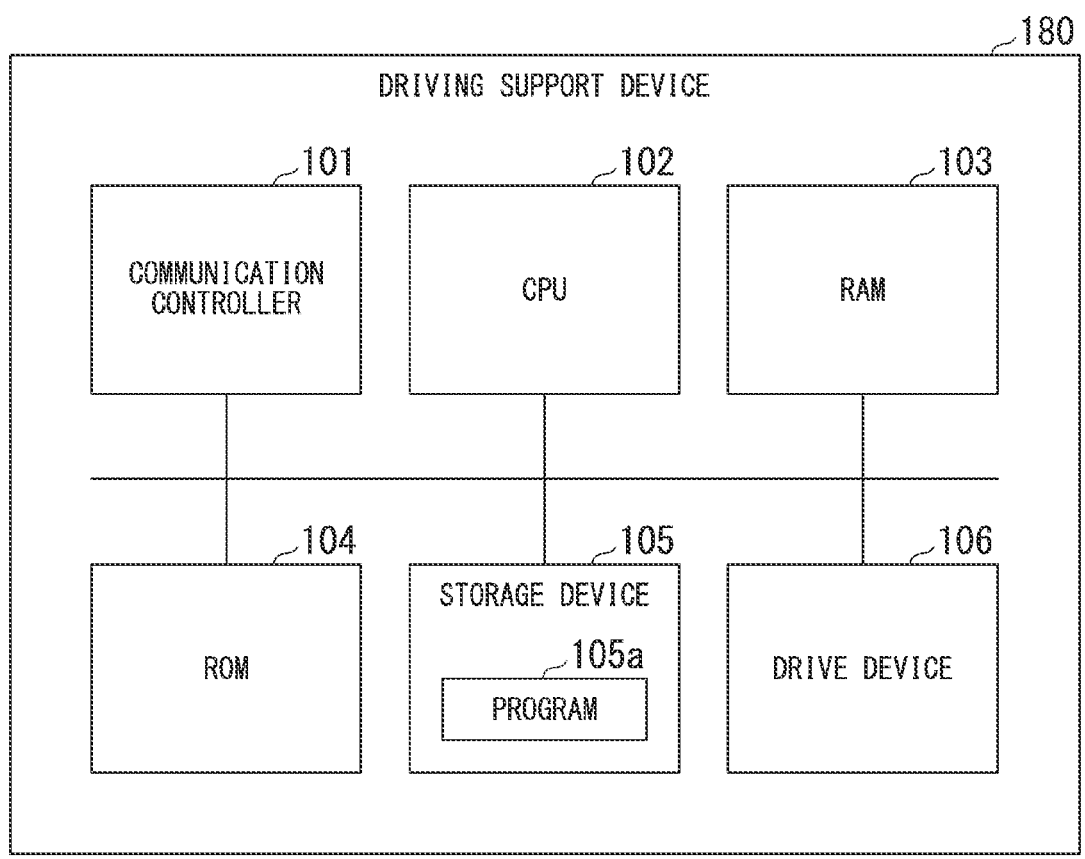
FIG. 9 is a diagram illustrating an example of a hardware configuration of the automated driving control device and the driving support device according to the embodiment.

FIG. 9 is a diagram illustrating an example of a hardware configuration of the automated driving control device 100 (computer) and the driving support device 180 according to the embodiment. As illustrated in the drawing, the automated driving control device 100 has a configuration in which a communication controller 101, a CPU 102, a random access memory (RAM) 103 used as a work memory, a read only memory (ROM) 104 storing a booting program, a storage device 105 such as a flash memory or a hard disk drive (HDD), a drive device 106, and the like are connected to each other via an internal bus or a dedicated communication line. The communication controller 101 communicates with elements other than the automated driving control device 100. A program 105*a* which is executed by the CPU 102 is stored in the storage device 105. The program is loaded to the RAM 103 by a direct memory access (DMA) controller (not illustrated) or the like and is executed by the CPU 102. As a result, some or all of the first control unit 120, the second control unit 160, and the driving support device 180 are realized.

The above-mentioned embodiment can be expressed as follows:

a driving support device including:

a storage device that stores a program; and a hardware processor, wherein the hardware processor is configured to execute the program stored in the storage device to realize:

a trajectory deriving unit configured to derive a reference trajectory in a predetermined section corresponding to a predetermined curve shape;

a frequency deriving unit configured to derive a first frequency which is determined according to a frequency component of a steering angle of a vehicle when it is assumed that the vehicle has passed through the predetermined section along the reference trajectory;

a detection value acquiring unit configured to acquire a detection value of the steering angle;

a component deriving unit configured to derive a frequency component of the steering angle acquired in the predetermined section when the vehicle has passed through the predetermined section; and a driving support unit configured to determine a driving support operation for a driver of the vehicle on the basis of a result of comparison between an integrated value of the frequency component in a first band equal to or greater than the first frequency and equal to or less than a second frequency and a first reference value.

While a mode for carrying out the present invention has been described above with reference to an embodiment, the present invention is not limited to the embodiment and can be embodied in various modifications and replacements without departing from the gist of the present invention.

For example, the driving support device 180 may be provided in the automated driving control device 100.

For example, a camera that images a driver may be provided in the vehicle system 1. The driving support device 180 may recognize a driver through image recognition. The driving support device 180 may acquire data of a driving style of the driver in the past from the storage unit on the basis of the result of recognition of the driver. The driving support device 180 may determine a driving support operation on the basis of the data of the driving style acquired from the storage unit. Accordingly, even when the driver has departed from the vehicle, the driving support device 180 can determine a driving support operation for each driver.

What is claimed is:

1. A driving support device comprising:
a trajectory deriving unit configured to derive a reference trajectory in a predetermined section corresponding to a predetermined curve shape;
a frequency deriving unit configured to derive a first frequency which is determined according to a frequency component of a steering angle of a vehicle when it is assumed that the vehicle has passed through the predetermined section along the reference trajectory;
a detection value acquiring unit configured to acquire a detection value of the steering angle;
a component deriving unit configured to derive a frequency component of the steering angle acquired in the predetermined section when the vehicle has passed through the predetermined section; and
a driving support unit configured to determine a driving support operation for a driver of the vehicle on the basis of a result of comparison between an integrated value of the frequency component in a first band equal to or greater than the first frequency and equal to or less than a second frequency and a first reference value.

2. The driving support device according to claim 1, wherein the driving support unit is configured to decrease a degree of driving support for the driver of the vehicle when the integrated value of the frequency component in the first band is less than the first reference value.

3. The driving support device according to claim 1, wherein the driving support device is configured to increase a degree of driving support for the driver of the vehicle when the integrated value of the frequency component in a second band equal to or greater than the second frequency is equal to or greater than a second reference value.

4. The driving support device according to claim 3, wherein the driving support unit is configured to determine a relationship between an amount of departure of the vehicle from a lane and a steering reaction force for preventing departure of the vehicle from the lane according to the degree of driving support when the steering reaction is output from a steering device of the vehicle as the driving support operation.

5. The driving support device according to claim 3, wherein the driving support unit is configured to adjust a speed of the vehicle according to the degree of driving support and an inter-vehicle distance when the inter-vehicle distance of the vehicle is maintained as the driving support operation.

6. The driving support device according to claim 1, wherein the trajectory deriving unit is configured to derive the reference trajectory as a candidate for a target trajectory of the vehicle on the basis of an integrated value of the frequency component in a third band equal to or greater than a third frequency determined according to the frequency component of the steering angle and equal to or less than the first frequency out of the frequency components of the steering angle acquired in the predetermined section in the past.

7. A driving support method that is performed by a computer of a driving support device, the driving support method comprising:
- a trajectory deriving step of deriving a reference trajectory in a predetermined section corresponding to a predetermined curve shape;
- a frequency deriving step of deriving a first frequency which is determined according to a frequency component of a steering angle of a vehicle when it is assumed that the vehicle has passed through the predetermined section along the reference trajectory;
- a detection value acquiring step of acquiring a detection value of the steering angle;
- a component deriving step of deriving a frequency component of the steering angle acquired in the predetermined section when the vehicle has passed through the predetermined section; and
- a driving support step of determining a driving support operation for a driver of the vehicle on the basis of a result of comparison between an integrated value of the frequency component in a first band equal to or greater than the first frequency and equal to or less than a second frequency and a first reference value.

8. A non-transitory computer-readable storage medium storing a program causing a computer to perform:
- a trajectory deriving process of deriving a reference trajectory in a predetermined section corresponding to a predetermined curve shape;
- a frequency deriving process of deriving a first frequency which is determined according to a frequency component of a steering angle of a vehicle when it is assumed that the vehicle has passed through the predetermined section along the reference trajectory;
- a detection value acquiring process of acquiring a detection value of the steering angle;
- a component deriving process of deriving a frequency component of the steering angle acquired in the predetermined section when the vehicle has passed through the predetermined section; and
- a driving support process of determining a driving support operation for a driver of the vehicle on the basis of a result of comparison between an integrated value of the frequency component in a first band equal to or greater than the first frequency and equal to or less than a second frequency and a first reference value.

* * * * *